United States Patent Office 3,168,147
Patented Feb. 2, 1965

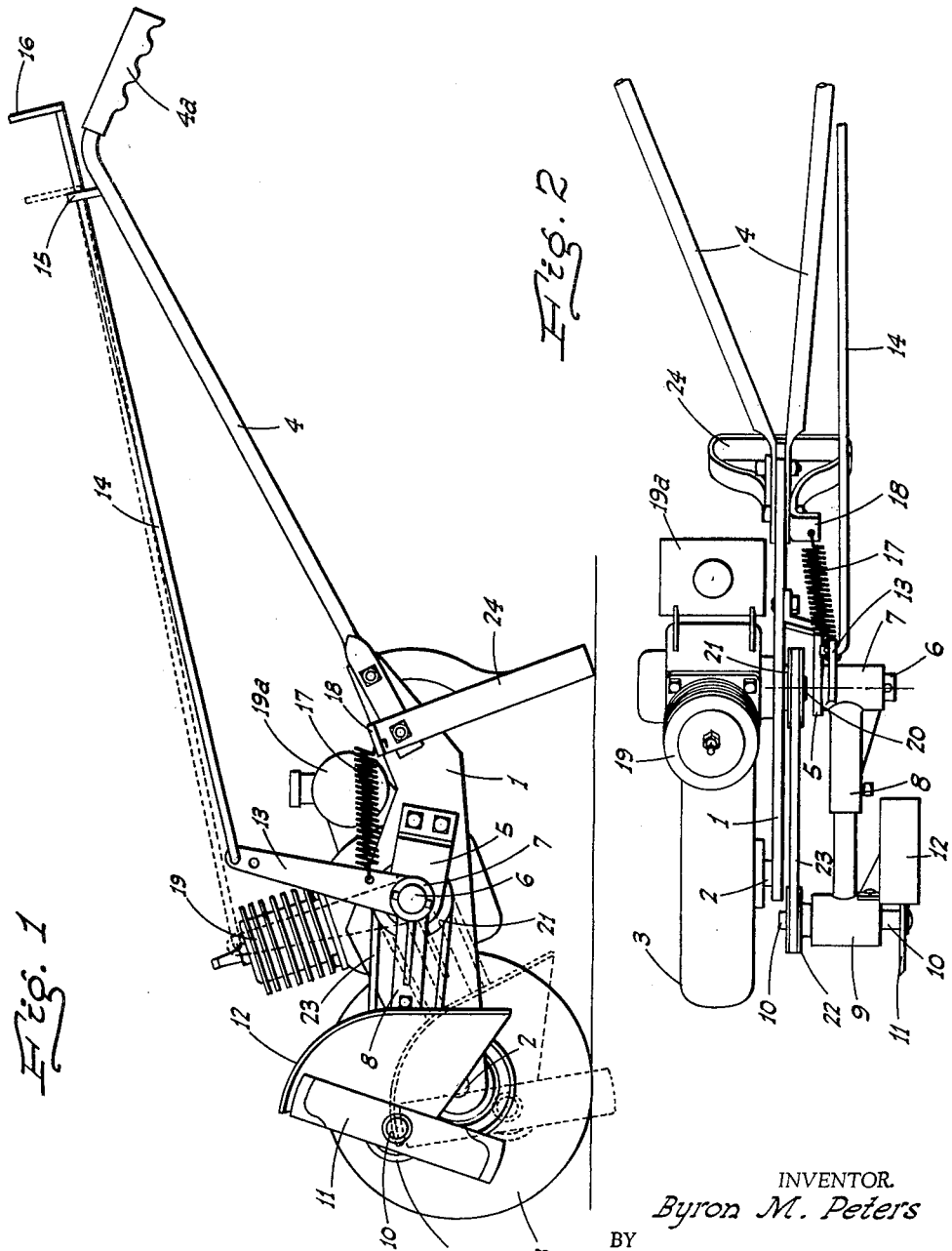

3,168,147
LAWN EDGER
Byron M. Peters, Rte. 1, Box 1695, Lathrop, Calif.
Filed Apr. 1, 1964, Ser. No. 356,451
1 Claim. (Cl. 172—15)

This invention relates to power actuated lawn edgers; a major object of the invention being to provide a device of this type which includes—in novel combination—a wheel supported frame, a rotary edging blade, means mounting the blade on the frame for vertical movement into and out of the ground, and means to raise and lower the blade as may be desired.

It is another important object of the invention to provide a lawn edger, as above, including drive means for the blade comprising an engine mounted on the frame and having a drive shaft, and a belt drive unit between the drive shaft and the blade; said belt drive unit being arranged so that no take-up or similar device is required regardless of whether the blade is in raised or lowered position.

In order to dispose the edging blade in the clear for the desired operation—and viewing thereof by the operator—it is necessary for the single supporting wheel and the relatively heavy engine to be disposed on the side of the frame opposite that on which the edging blade is mounted. This arrangement obviously tends to cause the edger to tip laterally toward the heavy side. It is, therefore, an additional object of the invention to provide the edger with handle bars arranged so that it will be easy—for the operator grasping the handle bars—to maintain the edger in proper balance and overcome the tendency of the same to tip laterally.

It is also an object of the invention to provide a lawn edger, as in the preceding paragraph, which includes novel means—finger operated from one handle bar—to swing the rotary edging blade from its raised position to lowered ground engaging position.

A further object of the invention is to provide a lawn edger which is designed for ease and economy of manufacture, and convenience of use.

A still further object of the invention is to provide a practical, reliable, and durable lawn edger and one which is exceedingly effective for the purpose for which it is designed.

These objects are accomplished by means of such structure and relative arrangement of parts as will fully appear by a perusal of the following specification and claim.

In the drawings:

FIG. 1 is a side elevation of the improved lawn edger; the rotary edging blade being shown in its raised position in full lines, and in its lowered or working position in dotted lines.

FIG. 2 is a fragmentary top plan view of the lawn edger.

Referring now more particularly to the drawings and to the characters of reference marked thereon, the frame 1 of the edger comprises an elongated rigid plate set on edge and extending generally horizontally. At its forward end the frame 1 is fitted with a spindle 2 which projects from one side of the frame and supports a ground wheel 3. At its rear end, the frame 1 is fitted with a pair of elongated, upwardly and rearwardly diverging handle bars 4, each provided at its rear end with a hand grip 4a whereby the edger may be manipulated by an operator walking behind the same.

Intermediate the ends of the frame 1 and on the side thereof opposite the wheel 3, said frame is provided with a lateral bracket 5 on which a laterally outwardly projecting spindle 6 is mounted. The bracket 5 is formed so that the portion thereof which supports the spindle 6 is spaced some distance outwardly from the adjacent face of the frame 1.

Turnable on the spindle 6 is a sleeve 7 from which an arm 8 projects forwardly; said arm being adjustable as to its length. At its forward end the arm 8 is formed with a transverse sleeve 9 which provides the bearing for a shaft 10; said shaft projecting at its ends beyond such sleeve.

A double-ended rotary edging blade 11 is fixed on the outer end of the shaft 10 and a grass-cuttings deflector 12—suitably secured to the sleeve 9—is disposed to the rear of the path of rotation of the blade and, of course, clear of the ground.

An arm 13 is rigid with and upstands from the sleeve 7, and is connected at its upper end to the forward end of a push rod 14. This push rod extends at an upward and rearward incline from the arm 13 and is slidable through a guide and stop member 15 mounted on and upstanding from the adjacent handle bar 4 just ahead of the corresponding hand grip 4a.

An upstanding pad 16, adapted for pushing engagement by the thumb of the hand grasping said grip 4a, is fixed on the rear end of the rod 14. The pad 16 is initially disposed rearwardly of the stop 15 a distance such that when said pad is advanced into engagement with the stop, the arm 8 will have been swung down so that the blade 11 will be lowered to its working or edging position, as indicated in dotted lines in FIG. 1.

The length of the arm 8 and the relationship of the spindle 6 to the wheel mounting spindle 2 is such that when the blade 11 is lowered to its working position, the shaft 10 will be relatively close to the vertical plane of said spindle 2, as shown. By reason of this arrangement, the edging blade 11—even though obviously spaced some distance laterally from the wheel 3—will still closely follow a curved path along which the wheel may be guided, as the edger is advanced along such path.

In order to yieldably maintain the edger blade 11 in a raised position clear of the ground, a tension spring 17 is connected between the arm 13 and a rearwardly disposed element 18 rigid with the frame 1. The strength of this spring is sufficient to but slightly more than counterbalance the weight of the edging structure ahead of the spindle 6. Thus, while said spring will cause such structure to be swung upwardly, it requires only a minimum of pressure against the pad 16 to lower the edging structure so that the blade 11 will be in its operative position.

In order to drive or rotate the edging blade 11 at the desired speed, a small gas engine 19 is secured on the frame 1 rearwardly of the wheel 3 and on the same side of said frame; the near end of the driven crankshaft 20 of the engine extending through the frame and being axially alined with but spaced from the spindle 6.

The engine 19 is mounted with a lean toward the wheel so that the major portion of its weight will be taken by the wheel rather than by the operator holding the grip 4a. Also, the engine is located in approximately the same longitudinal plane as the wheel, further providing for a good balance of the device.

It is to be understood that the engine includes, besides the fuel tank 19a, the various adjuncts necessary for the proper operation and control of the engine, but such adjuncts—being conventional—have been omitted from the drawings for the sake of simplicity of showing.

Secured on the end of the crank shaft 20 adjacent the spindle 6, is a pulley 21 which is in alinement with a similar pulley 22 on the related end of the shaft 10; there being a belt 23 extending between and being trained about such pulleys. By reason of the alinement on the engine crank shaft 20 with the spindle 6, the pulley 22 is always the same distance from the pulley 21 irrespective of the swinging movement of the arm 8. Consequently, no belt take-up device is necessary. The arm 8 is made adjustable as to length in order to take up any slack which may develop in the belt 23.

To prevent undesired downward tilting of the frame 1 at the rear and beyond a predetermined lowered position of the handle bars 4, a ground engaging and lateral tilt-preventing stop member or foot 24 is secured to and depends from the frame adjacent said end thereof.

The angle of divergence of the handle bars 4 relative to the longitudinal plane of the frame 1 is such that the operator—standing substantially intermediate and grasping the hand grips—will be positioned to the side of the frame on which the engine is mounted. As a result the operator can more easily balance the edger and maintain it in a laterally level upright position. Also, a better view of the edging blade is obtained by the operator from his position to said one side of the longitudinal plane of the rotary blade.

In operation, with the edging blade 11 in its initially raised position and with the engine 19 running, the operator grasps the grips 4a and by means of the handle bars 4 lifts the edger as a whole (about the wheel spindle 2 as an axis) until the foot 24 is well clear of the ground. The thumb of the hand which is adjacent the rod pad 16 is then firmly pressed against the same in a forward direction; the edging blade 11 thus being swung down to its working lowered position. Because of the nicety of balance of the parts, as previously described, the required thumb pressure on pad 16 is not great and can be easily maintained by the operator throughout a lawn edging operation. Upon the thumb thereafter being withdrawn from the pad 16, the spring 17 will act to lift the arm 8, and the edger blade thereon, to its raised position.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

A lawn edger comprising a relatively elongated frame which includes a flat vertically disposed plate, a ground engaging wheel mounted on the frame adjacent its forward end and on one side thereof, a rotary edging blade disposed laterally out from the opposite side of the plate adjacent the forward end thereof, an axial shaft for the blade extending transversely of the plate, means including a plate-mounted engine operative to drive the shaft, an arm projecting rearwardly from and supporting the shaft for rotation, a plate-supported transverse spindle for the rear end of the arm, a sleeve fixed with the rear end of the arm and embracing the spindle as a pivot, another arm fixed with and upstanding from the sleeve, a tension spring connected to said other arm and to the plate at a rearward point and of a strength to yieldably swing the first named arm upwardly to dispose the blade clear of the ground, a handle bar secured on and projecting upwardly and rearwardly from the plate, a push rod connected to the upper end of said other arm and extending upwardly and rearwardly to adjacent the rear end of the handle bar, a stop element on the bar through which the rod is slidable, and an upstanding pad on the rear end of the rod initially disposed a predetermined distance rearwardly of the stop element; movement of said pad forwardly into engagement with the stop element advancing the rod sufficient to swing the arms to a position with the blade lowered into ground engagement.

References Cited by the Examiner

UNITED STATES PATENTS

| | | | |
|---|---|---|---|
| Re. 24,559 | 11/58 | Hutchens | 56—25.4 |
| 1,383,294 | 7/21 | Gardner | 172—42 X |
| 2,218,948 | 10/40 | Cooper | 172—482 X |
| 2,521,033 | 9/50 | Bell | 56—25.4 |
| 2,538,230 | 1/51 | Boggs | 172—42 X |
| 2,645,987 | 7/53 | Brooks | 172—42 |
| 2,847,813 | 8/58 | Hanson | 172—15 |
| 2,862,344 | 12/58 | Caudle | 56—25.4 |
| 3,057,411 | 10/62 | Carlton | 172—15 |
| 3,129,770 | 4/64 | Ditter | 172—15 |

FOREIGN PATENTS 132,236  9/29  Switzerland.

ABRAHAM G. STONE, *Primary Examiner.*